United States Patent
Soyama et al.

(10) Patent No.: US 7,330,311 B2
(45) Date of Patent: Feb. 12, 2008

(54) TRANSMISSION TYPE SCREEN HAVING DIRECTIONAL LIGHT SCATTERING LENS AND FRESNEL LENS

(75) Inventors: Makoto Soyama, Niigata (JP); Masato Fuse, Niigata (JP)

(73) Assignee: Arisawa Mfg. Co., Ltd., Joetsu-shi, Niigata (JP)

( * ) Notice: Subject to any disclaimer, the term of this patent is extended or adjusted under 35 U.S.C. 154(b) by 286 days.

(21) Appl. No.: 11/177,862

(22) Filed: Jul. 8, 2005

(65) Prior Publication Data

US 2007/0008618 A1 Jan. 11, 2007

(51) Int. Cl.
*G03B 21/60* (2006.01)
*G03B 21/56* (2006.01)

(52) U.S. Cl. .............. 359/457; 359/455; 359/456; 359/460

(58) Field of Classification Search .......... 359/443, 359/454–457, 460
See application file for complete search history.

(56) References Cited

U.S. PATENT DOCUMENTS 6,046,847 A * 4/2000 Takahashi ............... 359/457

FOREIGN PATENT DOCUMENTS

JP 60061738 A * 4/1985

* cited by examiner

*Primary Examiner*—Diane I. Lee
*Assistant Examiner*—Magda Cruz
(74) *Attorney, Agent, or Firm*—Osha•Liang LLP

(57) ABSTRACT

There is provided a transmission type screen having a directional light scattering lens and a fresnel lens, wherein the fresnel lens has contact portions that contact with the directional light scattering lens and non-contact portions which are provided between the contact portions, whose height is lower than that of the contact portions and which do not contact with the directional light scattering lens. The invention realizes the very practical transmission type screen that allows viewers to appreciate good images in which blur and Moire are inconspicuous by preventing the blur from occurring on the screen and by reducing the intensity of Moire which is caused by the periodic structure of the fresnel and lenticular lenses.

9 Claims, 13 Drawing Sheets

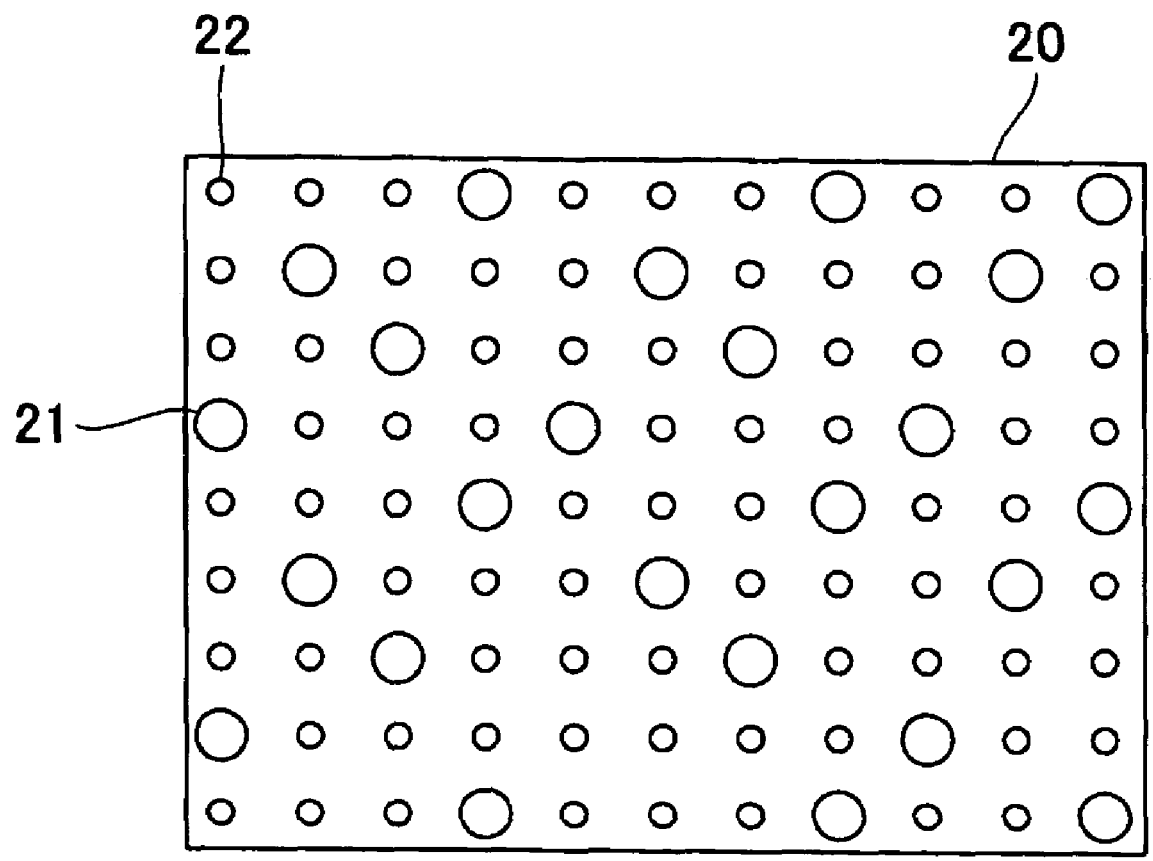
F I G . 13

TRANSMISSION TYPE SCREEN HAVING DIRECTIONAL LIGHT SCATTERING LENS AND FRESNEL LENS

BACKGROUND OF THE INVENTION

1. Field of the Invention

The present invention relates to a transmission type screen.

2. Related Art

A transmission type screen for use as a rear-projection screen has a configuration in which a front plate for protecting lenses, a lenticular lens and a fresnel lens are layered one after another in this order from the side of viewers in general.

By the way, the fresnel lens and the lenticular lens are disposed in very close proximity such that the projecting edges of the fresnel lens almost contact with the lenticular lens, or in contact. It is because the larger the gap between the fresnel lens and the lenticular lens, the more light deviates from the position where it is desired to pass, thus loosing the high precision optical characteristics, e.g., the high resolution, due to refraction of the light transmitting from the fresnel lens to the gap and transmitting from the gap to the lenticular lens.

However, this configuration may cause blur partially in the outer peripheral part of the screen in particular when the fresnel lens is made of synthetic resin because the projecting edges of the fresnel lens are slightly crushed and deformed when they contact with and are pressed by the lenticular lens, increasing the density of the part where the fresnel lens contacts with the lenticular lens.

Still more, because lens portions of the fresnel lens A and lens portions of the lenticular lens B are arranged in parallel with a predetermined pitch width and have a periodic structure as shown in FIG. 1, they interfere each other, causing Moire that hampers normal appreciation of images with a period of least common multiple of their pitch widths.

Accordingly, it is an object of the invention to solve the above-mentioned problems by providing a very practical transmission type screen that enables viewers to appreciate good images without having conspicuous blur and Moire by preventing the blur from occurring on the screen as much as possible by contacting portions of the fresnel lens with the lenticular lens at an adequate intervals and by reducing the intensity of Moire caused by the periodic structure of the fresnel lens and the directional light scattering lens, e.g., the lenticular lens, as much as possible.

This object may be achieved through the combination of features described in an independent claim of the invention. Dependent claims thereof specify preferable embodiments of the invention.

SUMMARY OF INVENTION

According to a first aspect of the invention, there is provided a transmission type screen having a directional light scattering lens and a fresnel lens, wherein the fresnel lens has contact portions that contact with the directional light scattering lens and non-contact portions which are provided between the contact portions, whose height is lower than that of the contact portions and which do not contact with the directional light scattering lens.

In the transmission type screen, a lenticular lens may be adopted as the directional light scattering lens, a pitch width of the lenticular lens maybe differentiated from that of the fresnel lens and the contact portions of the fresnel lens may be provided at intervals corresponding to a least common multiple of those pitch widths.

Preferably, the pitch width of the fresnel lens is set with regularity.

Preferably, the height of the non-contact portions located in the outer peripheral part of the fresnel lens is lower than the height of the contact portions of the fresnel lens squashed by the directional light scattering lens. Still more, the height of the non-contact portions located in the outer peripheral part of the fresnel lens may be lower than the contact portions of the fresnel lens by 10 μm or more.

Preferably, the contact portions of the fresnel lens are provided at intervals of 500 μm or less.

The directional light scattering lens may have a plurality of higher projecting portions that project toward the fresnel lens and a plurality of lower projecting portions that project toward the fresnel lens and that have height lower than that of the higher projecting portions. Still more, the plurality of higher projecting portions of the directional light scattering lens maybe disposed at positions where they contact with the contact portions of the fresnel lens. Furthermore, the higher projecting portions adjacent to each other in the lenticular lens may be disposed at offset position in terms of the plane direction of the transmission type screen.

Because the invention is constructed as described above, it can realize the very practical transmission type screen which allows viewers to appreciate good images in which blur and Moire are inconspicuous by preventing the blur from occurring on the screen and by reducing intensity of Moire which is otherwise caused by the periodic structure of the fresnel lens and the directional light scattering lens, e.g., lenticular lens.

It is noted that the summary of the invention described above does not necessarily describe all necessary features of the invention. The invention may also be a sub-combination of the features described above.

BRIEF DESCRIPTION OF THE DRAWINGS

FIG. 13 is a plan view of a fly-eye lens as another example of the directional light scattering lens.

DETAILED DESCRIPTION OF THE INVENTION

Figure 1:
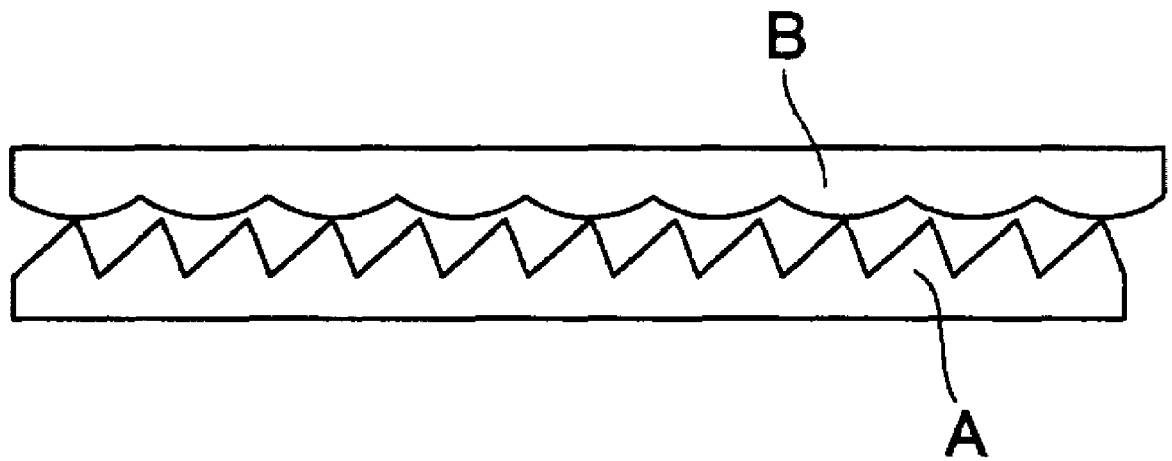
FIG. 1 is a schematic section view for explaining conventional lenticular and fresnel lenses.

The invention will now be described based on preferred embodiments while showing operations of the invention based on the drawings, which do not intend to limit the scope of the invention, but exemplify the invention. All of the features and the combinations thereof described in the embodiments are not necessarily essential to the invention.

The concrete embodiments of the invention will be explained based on FIGS. 2 through 10.

According to the embodiment of the invention, there is provided a transmission type screen having a front plate for protecting lenses, a directional light scattering lens 1 and a fresnel lens 2 layered one after another in this order from the side of viewers, wherein the fresnel lens 2 has contact portions 3 that contact with the directional light scattering lens 1 and non-contact portions 4 which are provided between the contact portions 3, whose height is lower than that of the contact portion 3 and which do not contact with the directional light scattering lens 1, a pitch width of the directional light scattering lens 1 is differentiated from that of the fresnel lens 2, and the contact portions 3 of the fresnel lens 2 are provided at intervals corresponding to a least common multiple of those pitch widths.

Each part will now be explained in concrete.

A lenticular lens is adopted as the directional light scattering lens 1. In concrete, the lenticular lens 1 is what a large number of convex lenses that exhibit a light diffusing effect of diffusing image light in the horizontal direction and that extend in the vertical direction is arrayed in parallel on a substrate made of synthetic resin such as acrylic resin, polycarbonate resin or acryl-styrene copolymer formed into a sheet or film.

It is noted that the directional light scattering lens 1 is a micro-lens array having anisotropy that causes light to have directionality by transmitting therethrough and therefore, another directional light scattering lens such as a fly-eye lens may be used as the directional light scattering lens 1.

A so-called circular fresnel lens is adopted as the fresnel lens 2. It is what saw-tooth lenses having a condensing effect of converting image light which is diffused light into parallel light are provided concentrically on a substrate made of synthetic resin such as acrylic resin, polycarbonate resin or acryl-styrene copolymer formed into a sheet or film.

The pitch width of the lenticular lens 1 is differentiated from that of the fresnel lens 2.

The fresnel lens 2 is provided with the contact portions 3 that contact with the lenticular lens 1 and the non-contact portions 4 that do not contact with the lenticular lens 1. In the present embodiment, the contact portions 3 of the fresnel lens 2 are provided at intervals corresponding to the least common multiple of the pitch widths of the lenticular lens 1 and the fresnel lens 2, or more concretely, with the period of the least common multiple.

That is, the contact portions 3 are provided at intervals corresponding to intervals (period) of Moire that occurs at certain intervals decided by the pitch widths of the lenticular lens 1 and the fresnel lens 2 in the initial design as described later.

In the present embodiment, the contact portions 3 of the fresnel lens 2 are provided at intervals of 500 μm or less.

It is because Moire occurs with the period of least common multiple of the pitch widths of the lenticular lens 1 and the fresnel lens 2 where their periodic structures interfere each other as described above and it is hardly visible by human eyes if the interval of the contact portions 3 is 500 μm or less. Supposing that human eyes are distant from the screen by about 2.5 m, it is known that the size recognizable by the human eyes on the visual line in the screen is about 200 μm in average in such case. It is also known that when the position on the screen deviates by one degree from the visual line, the recognizable size becomes 500 μm in average and that the farther the position is away from the visual line, the larger the recognizable size becomes. Because the image projected on the screen is seen not only on the visual line but also as a whole including positions deviating from the visual line, an area distant from the visual line by more than 1 degree dominates the screen. Therefore, if the interval of Moire is 500 μm or less, it is hardly recognized when the image is seen from the position distant from the screen by about 2.5 m.

It is noted that the interval of the contact portions 3 maybe wider than 500 μm. In such a case, the larger the interval of the contact portions 3, the smaller the contact area and the contact density of the lenticular lens 1 and the fresnel lens 2 become. Therefore, even if the projecting edge of the lenticular lens 1 is pressed and is squashed by the fresnel lens 2, the change of the optical characteristics decreases accordingly and the blur becomes inconspicuous. Still more, the modulation by the lenticular lens 1 may be lowered and Moire intensity may be also reduced by increasing the difference of the pitches of the lenticular lens 1 and fresnel lens 2.

Figure 7:
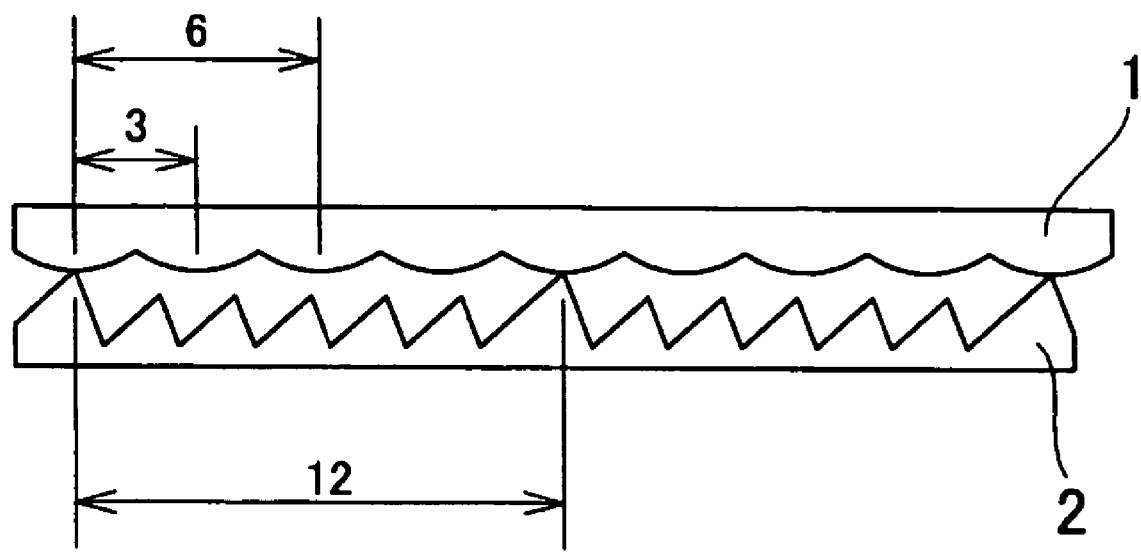
FIG. 7 is a schematic section view for explaining the lenticular and fresnel lenses according to another embodiment of the invention.
Figure 8:
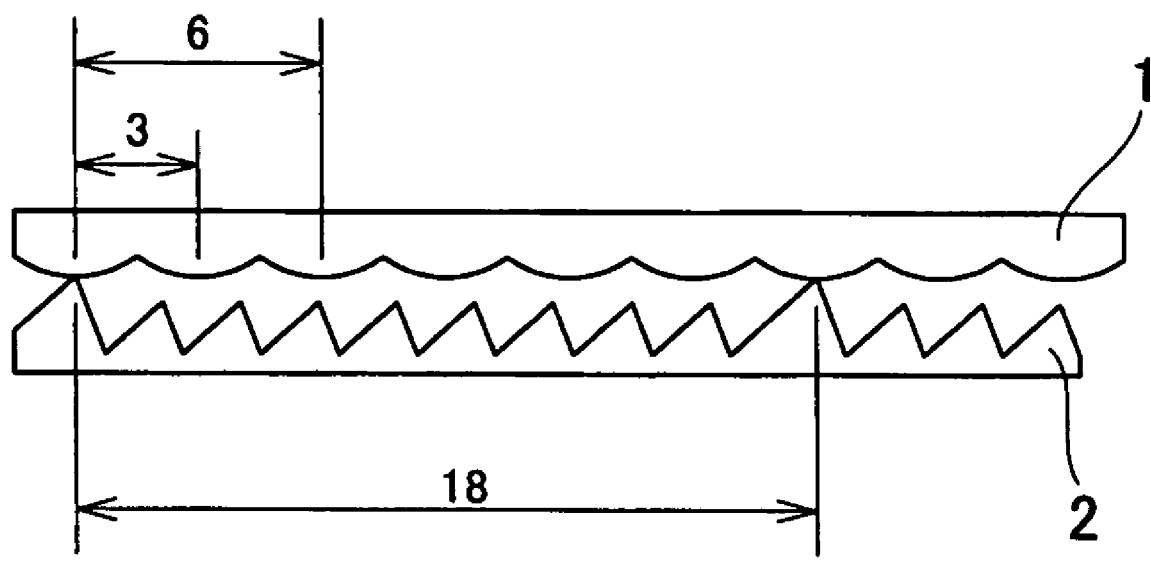
FIG. 8 is a schematic section view for explaining the lenticular and fresnel lenses according to the other embodiment of the invention.
Figure 9:
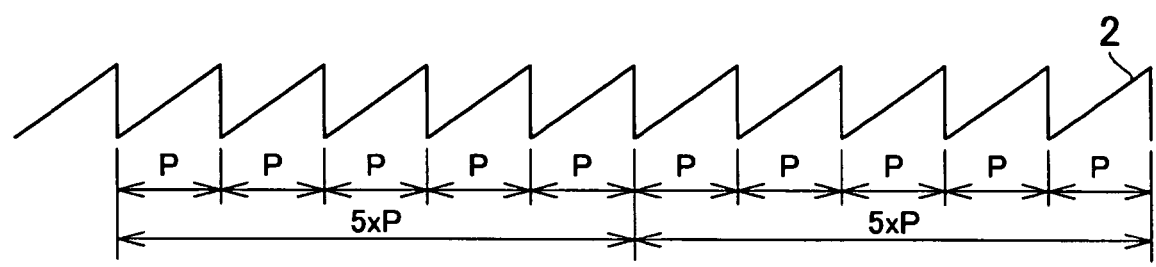
FIG. 9 is a schematic section view showing a pitch width of the fresnel lens set initially.

Further, as shown in other embodiments shown in FIGS. 7 and 8, the contact portions 3 of the fresnel lens 2 may be provided with a period obtained by multiplying the period of least common multiple of the pitch widths of the lenticular lens 1 and fresnel lens 2 with a natural number. It is noted that FIG. 7 shows a case when the contact portions 3 are provided with the period of least common multiple multiplied with 2 and FIG. 8 shows a case when they are provided with the period of least common multiple multiplied with 3. One can select this natural number adequately by considering hardness of the material, invisibility of Moire and programmability in processing a die.

In concrete, the pitch widths of the lenticular lens 1 and fresnel lens 2 are set as follows in the present embodiment so that Moire is hardly visible.

At first, the period of Moire is determined. It is assumed to be 500 μm in the present embodiment. At this time, the pitch widths of the lenticular lens 1 and of the fresnel lens 2 may be selected from values obtained by dividing 500 by all natural numbers (1 through 500), e.g., 500, 250, 166.66 . . . , 125, . . . and 1 μm.

Figure 6:
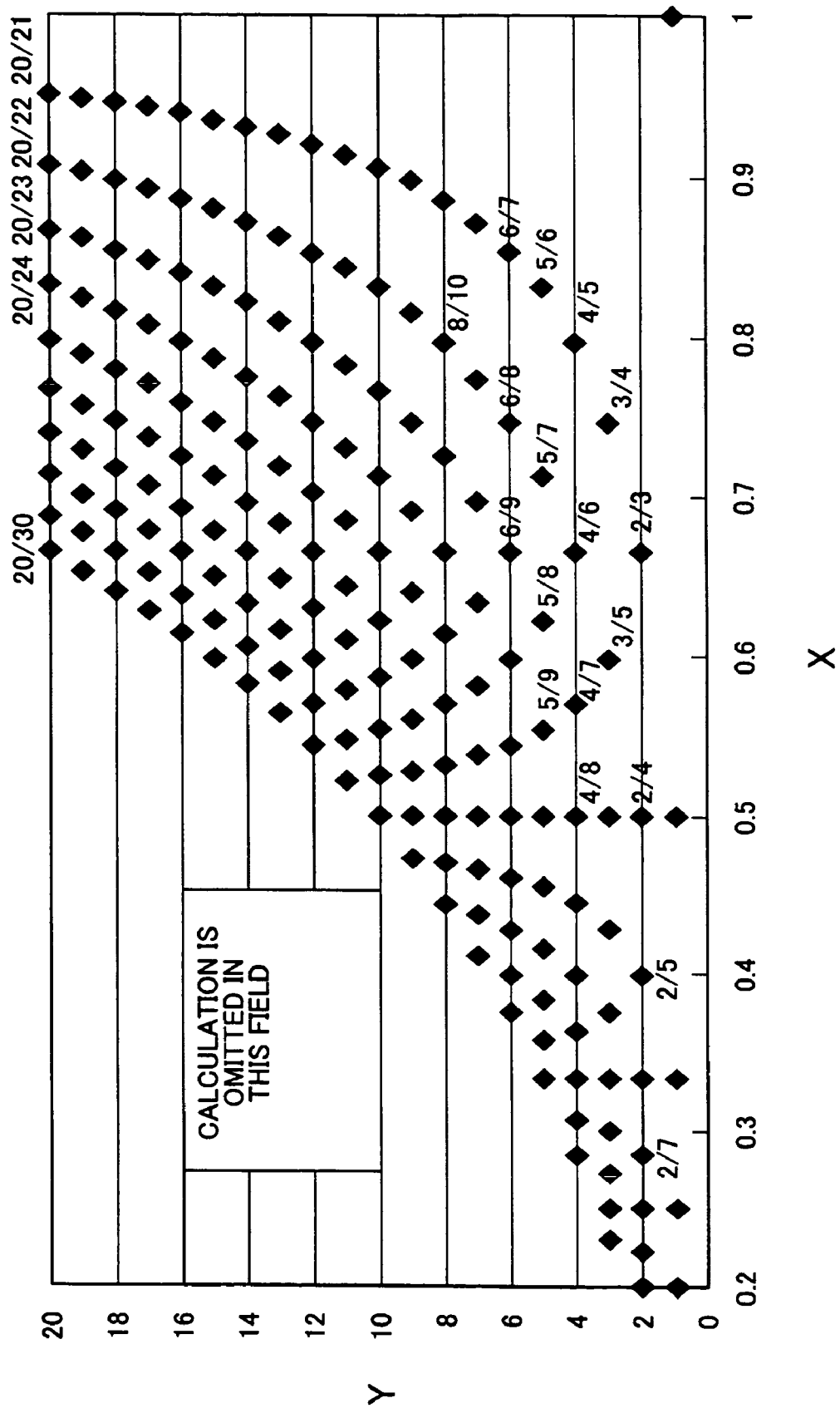
FIG. 6 is a graph showing a relationship between the ratio of pitches of the lenticular and fresnel lenses and a period of Moire.

Here, the pitch widths of the lenticular lens 1 and the fresnel lens 2 are selected so that the period of the Moire turns out to be 500 μm steadily even if the pitch widths deviate more or less in a molding process. In concrete, FIG. 6 shows a periodic relationship between X (pitch width of the lenticular lens 1/pitch width of the fresnel lens 2) and Y (Moire period/pitch width of the fresnel lens 2) and it can be seen from FIG. 6 that Moire does not change so much even if the pitch varies slightly by selecting a pitch ratio around 2/3. It is also the same when X described above is (the pitch width of the fresnel lens 2/pitch width of the lenticular lens 1) and Y is (the period of Moire/pitch width of the lenticular lens 1).

Figure 2:
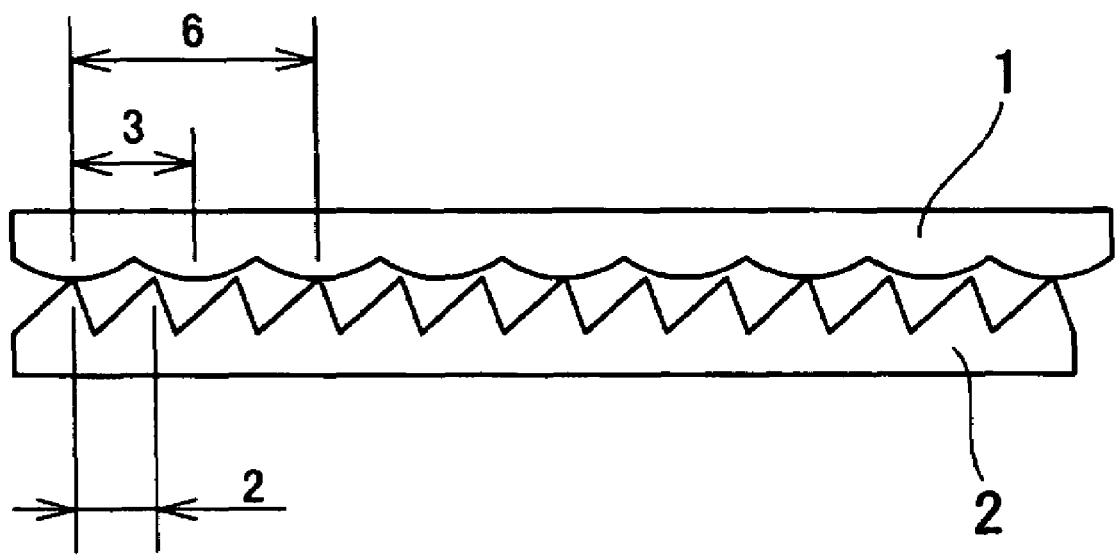
FIG. 2 is a schematic section view showing a ratio of pitches of lenticular and fresnel lenses according to an embodiment of the invention.
Figure 3:
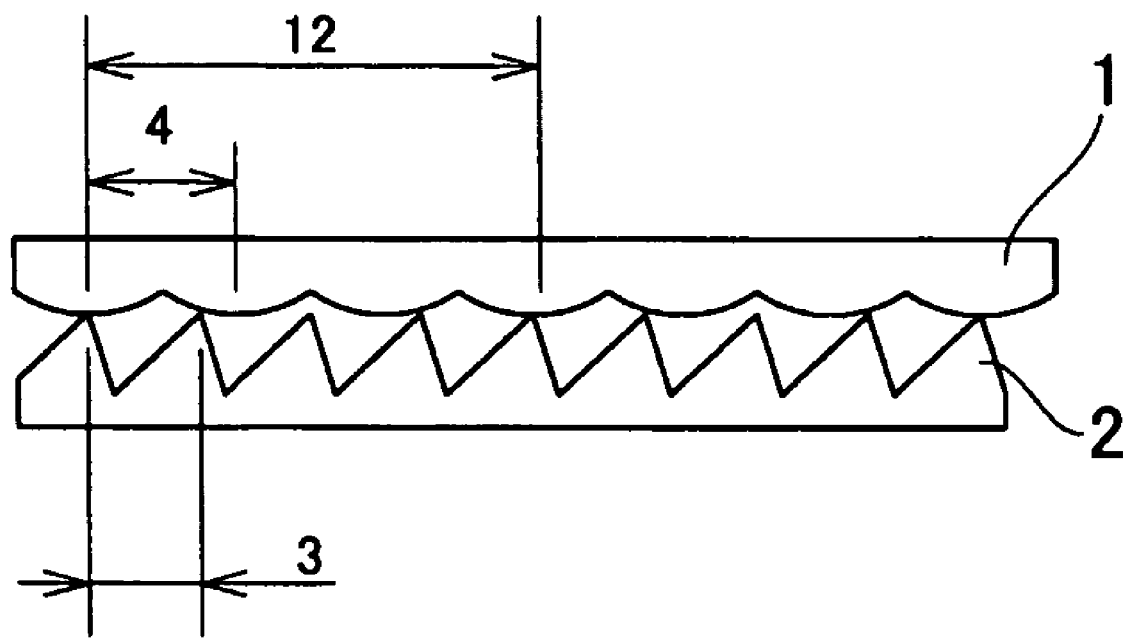
FIG. 3 is a schematic section view showing the ratio of pitches of the lenticular and fresnel lenses according to another embodiment of the invention.

In the present embodiment, the pitch ratio of the fresnel lens 2 and the lenticular lens 1 is set as 2 to 3 (see FIG. 2). Accordingly, the Moire period is 6. Because the Moire period corresponds to 500 μm here, the pitch width of the fresnel lens 2 is 166.66 . . . μm and the pitch width of the lenticular lens 1 is 125 μm in the initial design.

Figure 4:
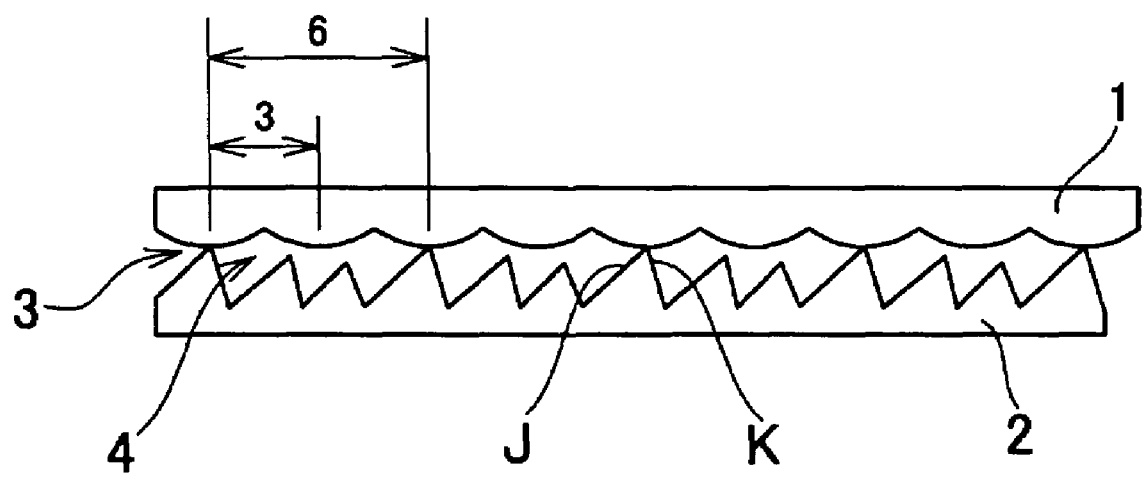
FIG. 4 is a schematic section view for explaining the lenticular and fresnel lenses according to the embodiment of the invention.
Figure 5:
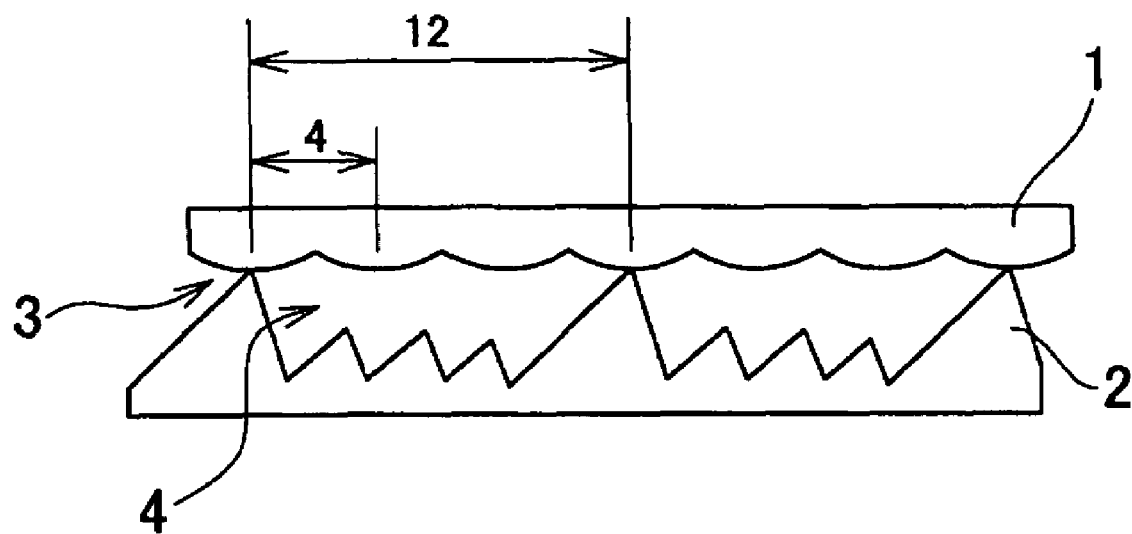
FIG. 5 is a schematic section view for explaining the lenticular and fresnel lenses according to the other embodiment of the invention.

FIG. 4 shows the fresnel lens 2 provided with the contact portions 3 and the non-contact portions 4 so as to conform to the relationship of 3 to 2 to 6 of ratio of the pitch width of the lenticular lens 1, the pitch width of the fresnel lens 2 and the Moire period.

Accordingly, the contact portions 3 are provided with the least common multiple of the pitch widths of the lenticular lens 1 and 2, i.e., at intervals of 500 μm or less, in the present embodiment.

Still more, the lenses between the contact portions 3 and in the outer peripheral part of the fresnel lens 2 are set as the non-contact portions 4 whose height is lower than the contact portions 3 by more than 10 μm. It is because (projecting edges of) the contact portions 3 of the fresnel lens 2 are squashed by about 10 μm when they contact with the lenticular lens 1. That is, preferably, the height of the non-contact portions 4 located in the outer peripheral part of the fresnel lens 2 is lower than the height of the contact portions 3 of the fresnel lens 2 when squashed by contacting with the lenticular lens 1.

Figure 10:
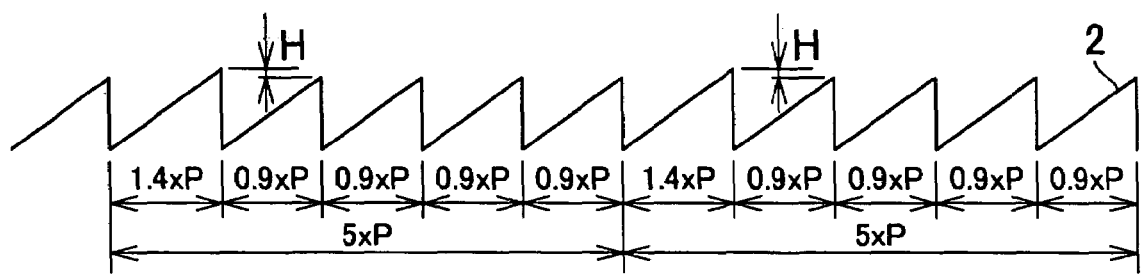
FIG. 10 is a schematic section view showing an exemplary setting of the pitch width of the fresnel lens.

In concrete, when the contact portions 3 are provided in the Fresnel lens 2 per 5 pitches for example as shown in FIG. 10, a difference of height H of more than 10 μm is created between the contact portions 3 and the non-contact portions 4 by setting the pitch width of the contact portion 3 and the pitch width of the non-contact portion 4 at 1.4 times and 0.9 times of the pitch width P in the initial design (see FIG. 9), respectively.

That is, the difference of height H of 10 μm or more is created between the contact portion 3 and the non-contact portion 4 by widening the pitch of the lens that is to become the contact portion 3 while uniformly shortening each of the plurality of lenses that is to become the non-contact portions 4 between the contact portions 3. Accordingly, the pitch width of the fresnel lens 2 of the present embodiment is not random but has such regularity.

It is noted that the reason why the height of only the non-contact portions 4 in the outer peripheral part of the fresnel lens 2 has been lowered by 10 μm or more is because blur described above hardly occurs in the center part of the fresnel lens 2, the height of the lenses is low in principle and accordingly, it is not necessary to take a measure for the blur.

That is, although the non-contact portions 4 may contact with the lenticular lens 1 when the difference of height of the non-contact portion 4 and the contact portion 3 is 10 μm or less, only the contact portions 3 provided at the predetermined intervals contact with the lenticular lens 1 even if the contact portions 3 contact with and are squashed by the lenticular lens 1 in the present embodiment. Thus, the contact area and the contact density of the lenticular lens 1 and the fresnel lens 2 may be reduced accordingly and the blur which may appear on the outer peripheral part of the screen is hardly visible from the viewers.

Still more, because the contact portions 3 of the fresnel lens 2 are provided with the period with which Moire occurs, the intensity of the Moire becomes small. Further, because Moire occurs with the period of 500 μm or less and is hardly visible in the present embodiment, the configuration that can reduce the intensity of Moire while preventing the blur from occurring may be readily realized, allowing the viewers to appreciate the very good images.

It is noted that although the case when the ratio of pitches of the Fresnel lens 2 and the lenticular lens 1 is 2 to 3 has been explained in the present embodiment, it is needless to say that other pitch ratio maybe selected. At this time, beside the pitch ratio of 2 to 3 at part where Moire does not change so much even if the pitch ratio of the lenticular lens 1 and the fresnel lens 2 varies more or less as shown in FIG. 6, it is preferable to select the pitch ratio such as 3 to 4 and 3 to 5 in the other examples shown in FIGS. 3 and 5 from a field where the points are not condensed.

Still more, the pitch width of the contact portions 3 is differentiated from the pitch width of the non-contact portions 4 of the Fresnel lens 2.

Accordingly, in conjunction with that the contact portions 3 are provided at the intervals described above, it can reduce a difference of contrast of light caused by a fresnel plane (plane J in FIG. 4) that contributes to condensation of light of the fresnel lens 2 and a rise plane (plane K in FIG. 4) that does not contribute to that and can reduce the intensity of Moire. It is noted that this is the same also when a fly-eye lens is used as the directional light scattering lens 1 and the difference of contrast of light and Moire intensity may be reduced by providing the contact portions 3 of the fresnel lens 2 at adequate intervals.

It is noted that the difference of contrast and Moire intensity may be reduced further by providing the non-contact portions 4 between the contact portions 3 with a plurality of pitch widths, not with all the same pitch width.

Still more, although the front plate not shown for protecting the lenses is provided in the present embodiment, a configuration not having the front plate may be also taken.

Figure 11:
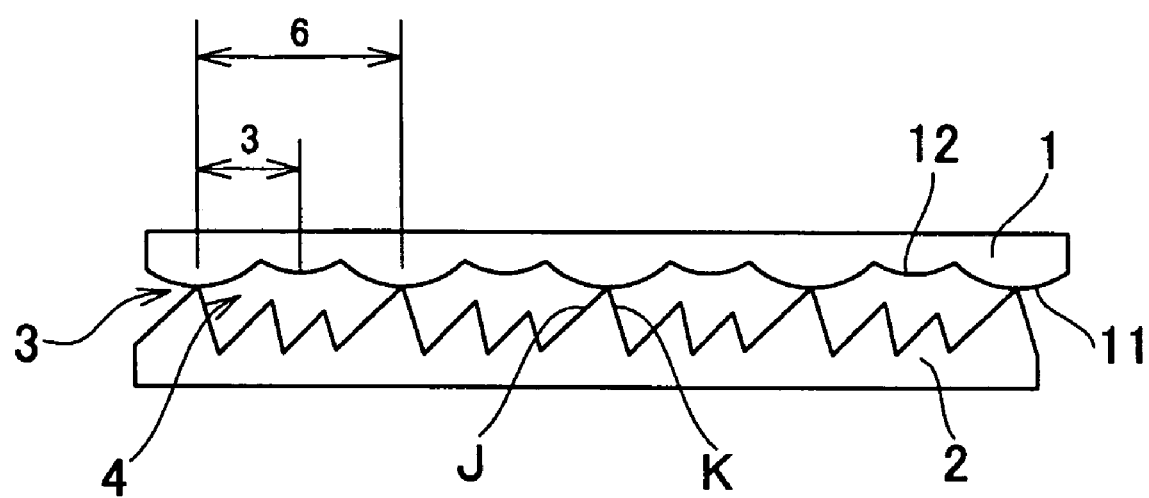
FIG. 11 is a section view showing another embodiment of the lenticular lens.

FIG. 11 is a section view showing another embodiment of the lenticular lens 1. The lenticular lens 1 shown in FIG. 11 has a plurality of higher projection portions 11 that project toward the fresnel lens 2 and a plurality of lower projecting portions 12 that project toward the fresnel lens 2 and that are lower than the higher projecting portions 11. Still more, the plurality of the higher projecting portions 11 of the lenticular lens 1 is positioned where they contact with the contact portions 3 of the fresnel lens 2. In the embodiment shown in FIG. 11, the higher projecting portions 11 of the lenticular lens 1 are disposed with a pitch width of 6 in conformity with the pitch width of 6 of the contact portions 3 of the fresnel lens 2. Here, the height of the higher projecting portion 11 and the lower projecting portion 12 may be set such that a difference thereof is smaller than the difference of height of the contact portions 3 of the fresnel lens 2 squashed by the lenticular lens 1 in contact therewith. Still more, a total of the difference of heights of the higher projecting portions 11 and the lower projecting portions 12 of the lenticular lens 1 and the difference of heights of the contact portions 3 and the non-contact portions 4 of the fresnel lens 2 may be set around the height squashed when the fresnel lens 2 contacts with the lenticular lens 1.

Contacting the higher projecting portions 11 of the lenticular lens 1 with the contact portions 3 of the fresnel lens 2 more aggressively as described in the above configuration prevents the lenticular lens 1 from contacting with the fresnel lens 2 at the part other than the contact portions described above, making the blur and Moire more inconspicuous.

It is noted that a waviness may be provided in the lenticular lens 1 in FIG. 11 in the longitudinal direction of the singular lens (in the direction of normal line in the drawing) to set the parts where the waviness is high as the higher projecting portion 11 and the part where the waviness is low as the lower projecting portion 12. In this case, the position of the higher projecting portion 11 may deviate among the adjacent singular lenses.

Figure 12:
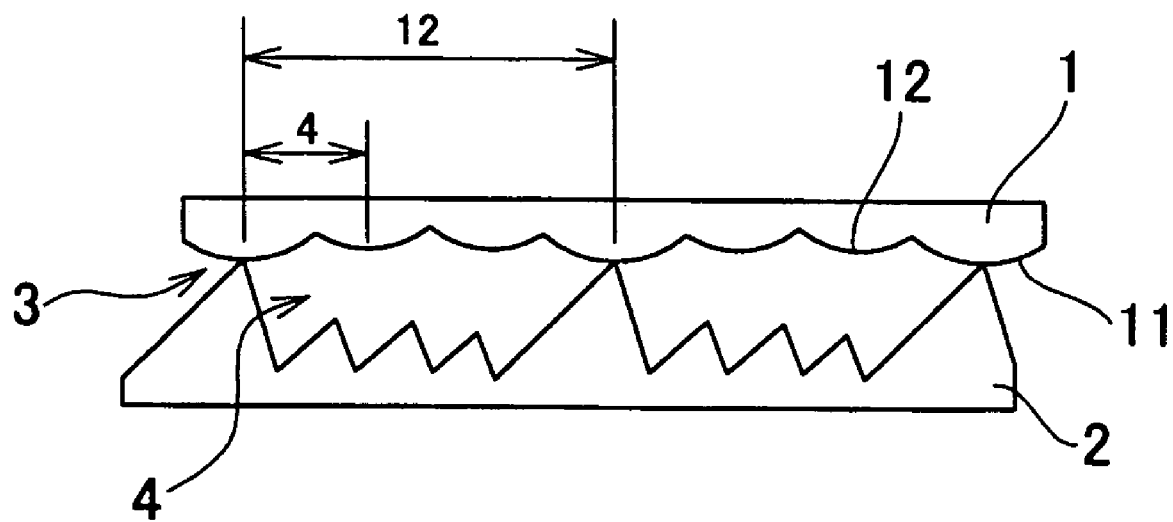
FIG. 12 is a section view showing a still other embodiment of the lenticular lens.

FIG. 12 is a section view showing another embodiment of the lenticular lens 1. In the lenticular lens 1 shown in FIG. 12, the higher projecting portions 11 of the lenticular lens 1 are disposed with a pitch width of 12 in conformity with the pitch width of 12 of the contact portions 3 of the fresnel lens 2. Other configurations are the same with the lenticular lens 1 in FIG. 11, so that their explanation will be omitted here.

FIG. 13 is a plan view of the fly-eye lens 20 as another example of the directional light scattering lens. In the fly-eye lens 20 in FIG. 13, a large number of small singular lenses is arranged in a two-dimensional array. Those singular lenses include two types of singular lenses; one of them are of higher projecting portions 21 whose height is higher and which project toward the fresnel lens 2 and the other ones are of lower projecting portions 22 whose height is lower than that of the higher projecting portion 21. The higher projecting portions 21 adjacent to each other in the fly-eye lens 20 are disposed at positions offset in the plane direction of the transmission type screen. That is, the higher projecting portions 21 are disposed separately so as not adjacent to each other in either direction of vertical and horizontal directions. It makes the blurs and Moire on the screen more inconspicuous. It is noted that the difference of sizes of the higher and lower projecting portions 21 and 22 is exaggerated for the purpose of explanation in FIG. 13.

As described above, only the contact portions 3 of the fresnel lens 2 contact with the lenticular lens 1 at the adequate intervals and the non-contact portions 4 do not contact with that by configuring as described above in the present embodiment, the contact area and contact density of the fresnel lens 2 and the lenticular lens 1 may be reduced accordingly. Thereby, the change of optical characteristics may be reduced and not only the blur but also Moire become inconspicuous as the intensity of Moire is reduced.

Accordingly, the invention realizes the very practical transmission type screen that allows the viewers to appreciate good images in which blur and Moire are inconspicuous by preventing the blur from occurring on the screen and by reducing the intensity of Moire which is caused by the periodic structure of the fresnel and lenticular lenses.

Although the invention has been described by way of the exemplary embodiments, it should be understood that those skilled in the art might make many changes and substitutions without departing from the spirit and scope of the invention. It is obvious from the definition of the appended claims that the embodiments with such modifications also belong to the scope of the invention.

What is claimed is:

1. A transmission type screen having a directional light scattering lens and a fresnel lens,
    wherein said fresnel lens has contact portions that contact with said directional light scattering lens and non-contact portions which are provided between said contact portions, whose height is lower than that of said contact portions and which do not contact with said directional light scattering lens,
    wherein height of said non-contact portions located in the outer peripheral part of said fresnel lens is lower than the height of said contact portions of said fresnel lens squashed by said directional light scattering lens, and
    wherein the height of said non-contact portions located in the outer peripheral part of said fresnel lens is lower than said contact portions of said fresnel lens by 10 μm or more.

2. The transmission type screen as set forth in claim 1, wherein said directional light scattering lens has a plurality of higher projecting portions that project toward the fresnel lens and a plurality of lower projecting portions that project toward the fresnel lens and that have height lower than that of the higher projecting portions.

3. The transmission type screen as set forth in claim 2, wherein said plurality of higher projecting portions of said directional light scattering lens 1 is disposed at positions where they contact with said contact portions of said fresnel lens.

4. The transmission type screen as set forth in claim 2, wherein said higher projecting portions adjacent to each other in said directional light scattering lens are disposed at offset position in terms of the plane direction of said transmission type screen.

5. The transmission type screen as set forth in claim 1, wherein a fly-eye lens is adopted as said directional light scattering lens.

6. The transmission type screen as set forth in claim 5, wherein said directional light scattering lens has a plurality of higher projecting portions that project toward the fresnel lens and a plurality of lower projecting portions that project toward the fresnel lens and that have height lower than that of the higher projecting portions.

7. A transmission type screen having a directional light scattering lens and a fresnel lens,
    wherein said fresnel lens has contact portions that contact with said directional light scattering lens and non-contact portions which are provided between said contact portions, whose height is lower than that of said contact portions and which do not contact with said directional light scattering lens, and
    wherein said contact portions of said fresnel lens are provided at intervals of 500 μm or less.

8. The transmission type screen as set forth in claim 7, wherein a fly-eye lens is adopted as said directional light scattering lens.

9. The transmission type screen as set forth in claim 8, wherein said directional light scattering lens has a plurality of higher projecting portions that project toward the fresnel lens and a plurality of lower projecting portions that project toward the fresnel lens and that have height lower than that of the higher projecting portions.

* * * * *